(12) United States Patent
Landa et al.

(10) Patent No.: US 9,880,303 B2
(45) Date of Patent: *Jan. 30, 2018

(54) METHOD OF ANALYZING SEISMIC DATA (75) Inventors: Evgeny Landa, Pau (FR); Reda Baina, Pau (FR)

(73) Assignee: TOTAL SA, Courbevoie (FR)

( * ) Notice: Subject to any disclaimer, the term of this patent is extended or adjusted under 35 U.S.C. 154(b) by 1036 days.

This patent is subject to a terminal disclaimer.

(21) Appl. No.: 13/984,192

(22) PCT Filed: Feb. 8, 2011

(86) PCT No.: PCT/IB2011/000478
§ 371 (c)(1),
(2), (4) Date: Oct. 17, 2013

(87) PCT Pub. No.: WO2012/107792
PCT Pub. Date: Aug. 16, 2012

(65) Prior Publication Data
US 2014/0032119 A1    Jan. 30, 2014

(51) Int. Cl.
G01V 1/30    (2006.01)

(52) U.S. Cl.
CPC ..................... *G01V 1/30* (2013.01)

(58) Field of Classification Search
USPC .......................................................... 702/14
See application file for complete search history.

(56) References Cited

FOREIGN PATENT DOCUMENTS

WO    WO 2011154762    * 12/2011 ............... G01V 1/28

OTHER PUBLICATIONS

A. Klokov, separation and imaging of Seismic diffractions in Dip angle Domain, 5 pages, Barcelona, Spain Jun. 14-17, 2010, SPE Europec 2010.*
William S. Harlan, Signal/noise separation and velocity estimation, 1 pages, Nov. 1984, vol. 49, No. 11.*
D. Sacchi, Simultaneous Signal and Noise Modeling via Radon Transforms, 2004 CSES national Convention, 4 pages.*
Moshe Resher and Evegeny Landa, "Post-stack velocity analysis in the dip-angle domain using diffractions", 2008 European Association of Geoscientists & Engineers, *Geophysical Prospecting*, 1-11.

(Continued)

*Primary Examiner* — Tung Lau
(74) *Attorney, Agent, or Firm* — Patterson Thuente Pedersen, P.A.

(57) ABSTRACT

Post-migration common image gathers (CIGs) are generated in a dip angle domain from measured seismic data. From a CIG, a hybrid Radon model is determined, including a reflection model related to concave features in the CIG and a diffraction model related to linear features in the CIG. The reflection model is transformed with a reflection Radon operator applied along inversion trajectories restricted around apices of the concave features to obtain reflection data. The diffraction model is transformed with a diffraction Radon operator to obtain diffraction data. The reflection and diffraction data at different horizontal positions can then be combined and summed to generate a migrated image of the subsurface.

18 Claims, 7 Drawing Sheets (56) References Cited

OTHER PUBLICATIONS

A. Klokov (Opera), R. Baina (Opera) & E. Landa (Opera): "Separation and Imaging of Seismic Diffractions in Dip Angle Domain", 72 EAGE Conference and Exhibition Jun. 17, 2010 (Jun. 17, 2010), XP000002659191, Retrieved from the Internet: URL:http://opera.univ-pau.fr/live/digitalAssets/100/100085_EarthDoc-39391.pdf [retrieved on Jun. 17, 2010].

Bienati N et al: "Limited Aperture Migration in the Angle Domain", 71st European Association of Geoscientists and Engineers Conference and Exhibition 2009 : Amsterdam, Netherlands, Jun. 8-11, 2009, Red Hook, NY : Curran, US, Jun. 8, 2009 (Jun. 8, 2009), pp. 2443-244, XP009152160 ISBN: 978-1-61567-236-3.

Sergey Fomel "Applications of plane-wave destruction filters", Geophysics, vol. 67, No. 6 (Nov.-Dec. 2002) p. 1946-1960, 21 Figs. 10.1190/1.1527095.

\* cited by examiner

FIG. 1

PRIOR ART

METHOD OF ANALYZING SEISMIC DATA

PRIORITY CLAIM

The present application is a National Phase entry of PCT Application No. PCT/IB2011/000478, filed Feb. 8, 2011, said application being hereby incorporated by reference herein in its entirety.

FIELD OF THE INVENTION

The present invention relates a method for analyzing seismic data. More specifically, of geophysical prospecting in areas that contain carbonate reservoirs, i.e. where the hydrocarbon containing rocks are carbonate rocks such as limestone, for example.

BACKGROUND OF THE INVENTION

Carbonate reservoirs are difficult to exploit because of their heterogeneous nature. A major challenge in carbonate environments is therefore to map these heterogeneities which have a strong impact on oil and gas production. In many carbonate reservoirs, the porosity of the rock (i.e. matrix porosity) is high enough to contain large amounts of oil in place, but the permeability is mainly provided by fracture corridors, not by the intrinsic nature of the rock matrix. In other reservoirs, the oil in place is found primarily in caves and conduits formed in the rock formation by infiltration and action of rain water (so-called karst formations).

Therefore, the ability to detect these heterogeneities and possibly characterize their properties, i.e. obtaining three dimensional maps of their geometry and characteristics, is essential in these environments.

To obtain images of the subsurface, a seismic method is often used, which consists in creating and sending seismic waves in the ground using sources such as explosives or vibrator trucks on land, or airguns offshore. The seismic waves penetrate the ground and get bounced, or reflected off major geological discontinuities in the subsurface. As a result, they come back to the surface, where they are recorded using arrays of three component geophones (on land), or hydrophones (offshore) which are regularly distributed to cover areas of several square kilometres.

Seismic reflections assume that local planes are large compared to the seismic wavefront. When the subsurface contains edges and short-scale heterogeneities, the wavefront undergoes diffractions rather than reflections.

Diffraction effects are typically present with carbonate reservoirs, because of the characteristics mentioned above, i.e. the presence of faults, fissures, conduits, caves etc.

The importance of diffracted waves for obtaining better images of subsurface carbonate-type reservoirs has long been recognized.

Typically, diffracted energy is one or even two orders of magnitude weaker than the reflected one and it is not easy to distinguish diffracted events in a seismic dataset or a diffraction image in a seismic image. Therefore, diffracted and reflected energy have to be separated properly.

A suitable domain for performing this separation is the post-migration dip angle domain as disclosed by Landa et al. "Separation, imaging, and velocity analysis of seismic diffractions using migrated dip angle gathers", SEG Expanded Abstracts, Vol. 27, pages 2176-2180, 2008. In this document, reflection and diffraction events are separated in the dip angle domain using a plane-wave-destruction method, described by Fomel: "Applications of plane-wave destruction filters", Geophysics, 67, 1946-1960, 2002, requiring accurate estimation of the velocity model used for the migration.

Pre-stack post-migration common image gathers in the dip angle domain are generated from seismic data conventionally measured and recorded. A dip angle common image gather (DA-CIG) is a bi-dimensional data structure with a first axis representing the dip angle and a second axis representing the depth.

A DA-CIG is typically obtained for one horizontal position (x, y) by summing contributions from a number of seismic traces recorded by seismic detectors around the horizontal position (x, y). Those contributions for a depth z and a dip angle $\alpha$ are determined by assuming that some structure of the subsurface at position (x, y, z) has a dip angle $\alpha$ and bounces back seismic waves from the source. Snell's law and a model for estimating the velocity of seismic waves in the migration process determine detector positions and respective reading times for those detectors, providing contributions to the DA-CIG at (x, y) for (z, $\alpha$).

If the structure at position (x, y, z) is a reflector with a dip angle $\alpha$, then seismic energy is specularly reflected and yields a concave feature in the DA-CIG at (x, y) which is approximately of a parabolic shape with an apex located at (z, $\alpha$).

If a diffractor rather than a reflector is the structure located at (x, y, z), energy is scattered in all directions from such structure, which results in a flat feature in the DA-CIG at (x, y) for the depth value z. Such flat feature is horizontal if the velocity model used for migration is an accurate estimation of the seismic velocities in the subsurface, and if the DA-CIG is located directly above the diffractor. It is slanted and quasi-linear if there is some error in the velocity model.

Figure 1:
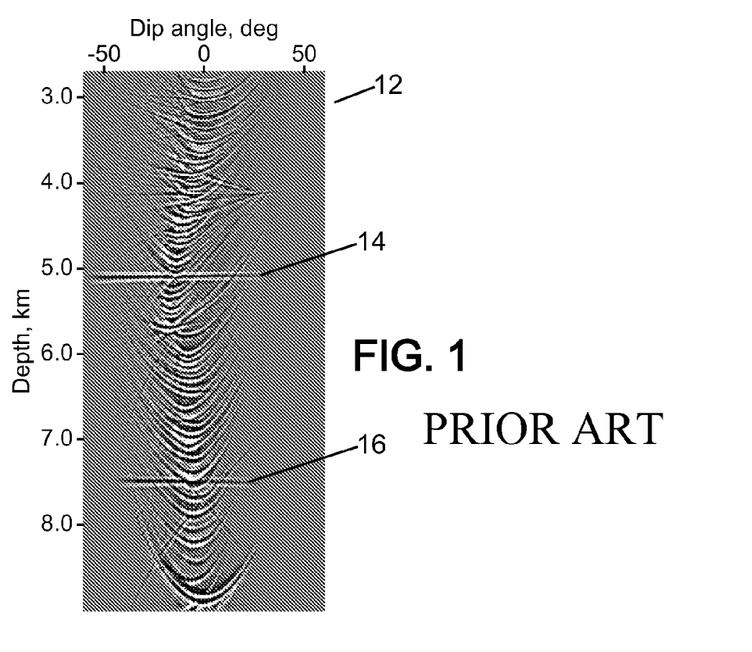
FIG. 1, is a prior art example of a picture of a common image gather in the dip angle domain (DA-CIG).

A DA-CIG 12 is illustrated in FIG. 1. The illustrated DA-CIG 12 is located above two diffraction points and is computed from measured seismic data using a correct velocity model. When viewing a DA-CIG 12, two kinds of features can thus be distinguished. The first kind consists in concave features and the second kind consists in flat features. The concave features are related to reflection events and the flat features are related to diffraction events. For instance, two horizontal features 14, 16 appear in the common image gather of FIG. 1. Both horizontal features are related to diffraction points in the subsurface.

The summation of DA-CIGs obtained for different horizontal positions produces a seismic image of the subsurface. An image of a reflector is formed by a constructive summation of these DA-CIGs in a vicinity of the apexes of the concave features, in the form of smiles, related to such reflector.

When summing the DA-CIGs to assemble the migrated seismic image, the tails of the smile-shaped reflection features are either annihilated in the migrated image due to destructive optimal summation, or they create migration noise due to aliasing in the data and truncation of the migration aperture. The ability to control migration aperture is important in order to reduce this noise in migrated images.

In "Limited aperture migration in the Angle domain", 71$^{st}$ EAGE Conference, Expanded Abstracts, Amsterdam, Netherlands, 8-11 Jun. 2009, N. Bienati, et al., proposed a method using the property that specular energy of the reflection events is concentrated in a vicinity of the apex position. Their method includes detecting apices on DA-CIGs by automated picking, and muting the rest of the energy prior to summation. The migrated images obtained after such processing tend to be over-smoothed and they may thus miss small-scale structural features such as fault planes and steps. The diffraction components are removed.

In "Separation and imaging of seismic diffractions in dip-angle domain", 72$^{nd}$ EAGE Conference, Expanded Abstracts, 14-17 Jun. 2010, A. Klokov A., et al., introduced the use of a hybrid Radon transform to separate diffraction and reflection features in CA-CIGs. In a first step, the apex regions of the parabolas related to the reflection events are detected and muted; then, the hybrid Radon transform is applied to separate the remaining tails parts of the parabolas from the linear-shaped diffraction features. An image of the diffractors only can thus be obtained after summation of the processed DA-CIGs.

There is a need for a method of analyzing seismic data which produces seismic images with a low migration noise and a good imaging of small-scale structures in the underground.

SUMMARY OF THE INVENTION

A method of analyzing seismic data is proposed, comprising:
- generating a post-migration common image gather in a dip angle domain from measured seismic data;
- determining a hybrid Radon model associated with the common image gather, including a reflection model related to concave features in the common image gather and a diffraction model related to linear features in the common image gather;
- transforming the reflection model with a reflection Radon operator applied along inversion trajectories restricted around apices of the concave features to obtain reflection data; and
- transforming the diffraction model with a diffraction Radon operator to obtain diffraction data.

The method limits the migration aperture in the dip-angle domain, which can optimally preserve both specular and non-specular components of the wavefield. It uses a modified Radon transform which can be referred to as Limited Aperture Hybrid Radon Transform (LAHRT).

The diffraction data can be analyzed separately from the reflection data to look for small-scaled structures of interest. Alternatively, the reflection data and diffraction data obtained by transforming the reflection and diffraction models with the Radon operators are added together to obtain a processed common image gather. Typically, such processed common image gathers are obtained for different horizontal positions. The method may then include a further step of summing the data in the processed common image gathers to generate a migrated image of the subsurface.

In an embodiment, determining the hybrid Radon model associated with the common image gather comprises minimizing an objective function:

$$F(m_d, m_r) = \|L_d \cdot m_d + L_r \cdot m_r - d\|_2 + \epsilon_d \|W_d \cdot m_d\|_2 + \epsilon_r \|W_r \cdot m_r\|_2$$

where $m_d$ and $m_r$ are data vectors of the diffraction model and of the reflection model, respectively, $L_d$ and $L_r$ are the diffraction and reflection Radon operators, respectively, d represents a data vector of the common image gather, $W_d$ and $W_r$ are model space weights, $\epsilon_d$ and $\epsilon_r$ are measures of sparseness for diffraction and reflection, respectively, and $\|\cdot\|_2$ is an $L_2$ measure.

To achieve an optimal aperture migration, for each sample, the inversion trajectory of the reflection component is restricted by the apex vicinity only, while typically the diffraction component is fully inverted. In other words, transforming the reflection model, noted $m_r(\zeta, c, z_1)$, with the reflection Radon operator can comprise computing the reflection data, noted $D_r(\alpha, z)$, as:

$$D_r(\alpha, z) = \sum_c \sum_\zeta m_r(\zeta, c, z_1 = z - c \cdot (\alpha - \zeta)^2)$$

where $\alpha$ and z are respectively dip angle and depth coordinates in the common image gather, c, $\zeta$ and $z_1$ are respectively parabola curvature, parabola apex shift and depth coordinates in the reflection model, the sum on the parabola apex shift coordinate $\zeta$ being restricted to values of $\zeta$ around the dip angle coordinate $\alpha$.

The size of the apex vicinity can be defined by referring to the stationary phase principle and Fresnel zone considerations. Although the Fresnel zone is theoretically defined for monochromatic waves only and reflection seismology deals with broadband wavelets, the Fresnel zone can be thought of as a "zone of influence". This concept can be extended to the angle domain as indicated in the above-mentioned Bienati et al. paper. It provides a criterion for further optimizing the migration aperture.

For example, when computing the reflection data $D_r(\alpha, z)$ for a dip angle coordinate $\alpha$ and a depth coordinate z, the sum on the parabola apex shift coordinate $\zeta$ can be restricted, for a given value of the parabola curvature coordinate c, to values of $\zeta$ different from $\alpha$ by less than about $$\pm \sqrt{\frac{\lambda}{4c}},$$

where $\lambda$ is an average wavelength of seismic waves used to measure the seismic data.

Another aspect of the invention relates to a system for analyzing seismic data, comprising computer resource configured to carry out an analysis method as mentioned above.

Another aspect of the invention relates to a computer program product for a system for analyzing seismic data, comprising instructions to carry out a method as claimed in any one of the preceding claims when said program product is run in a computer processing unit of the system for analyzing seismic data. The computer program product is typically embodied on a computer-readable medium.

Other features and advantages of the method and apparatus disclosed herein will become apparent from the following description of non-limiting embodiments, with reference to the appended drawings.

DESCRIPTION OF EMBODIMENTS

Figure 2:
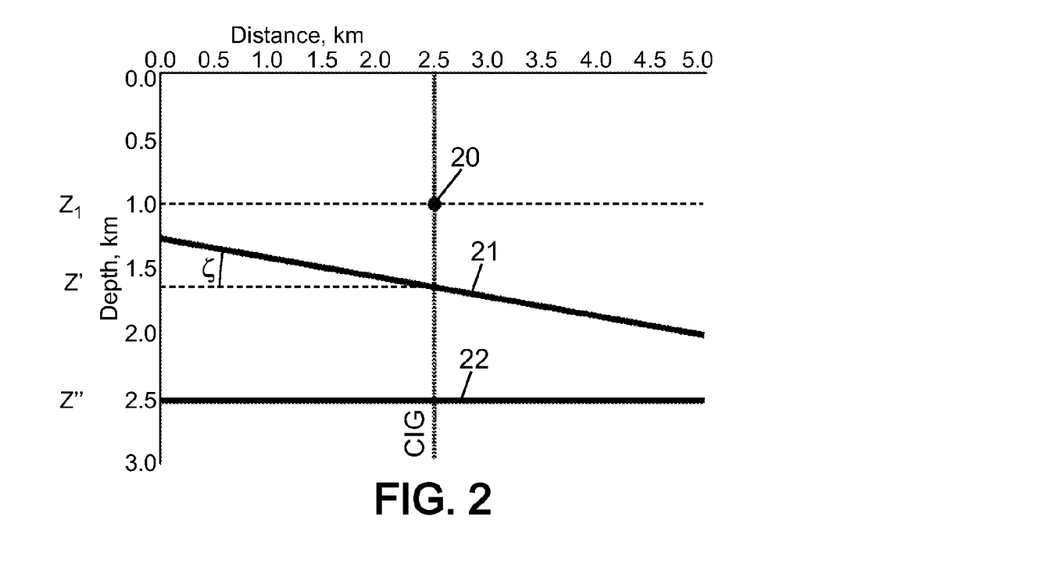
FIGS. 2-3 are diagrams for explaining how structure in the subsurface (FIG. 2) can produce features in a DA-CIG (FIG. 3).
Figure 3:
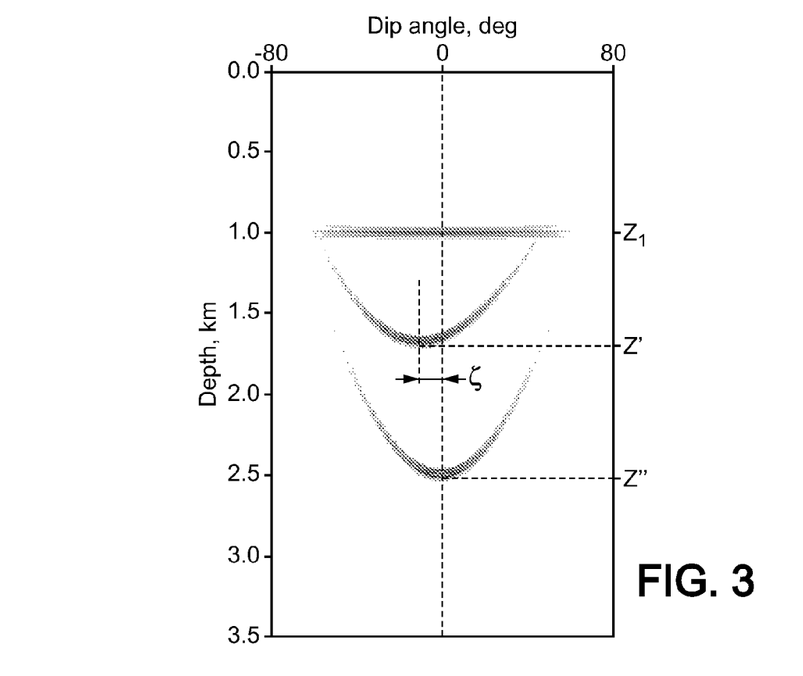

FIG. 2 is a schematic illustration of the subsurface with a simplified representation of backscattering structures. In this example, at the horizontal position x=2.5 (the y dimension is not shown), a diffractor 20 is at a depth z=$z_1$, and two reflecting surfaces 21, 22 are at depths z=z' (dip angle α=−ζ) and z=z'' (dip angle α=0). A dip angle common image gather (DA-CIG) at this horizontal position is shown in FIG. 3. It is seen that the diffractor 20 gives rise to a quasi-linear feature at depth $z_1$, while the reflecting structures 21, 22 give rise to respective parabola or smiled-shaped features with apices located at depth z' and z''. The apex of each parabola is shifted with respect to the position α=0 in the DA-CIG by a value corresponding to the dip angle of the reflecting structure.

In practice, the subsurface includes numerous reflecting and diffracting structures. So real-world DA-CIGs look much more complex, with many smile-shaped and linear features, and also background noise and aliasing noise, i.e. noise due to the finite spatial sampling rate of the seismic signal.

Figure 4:
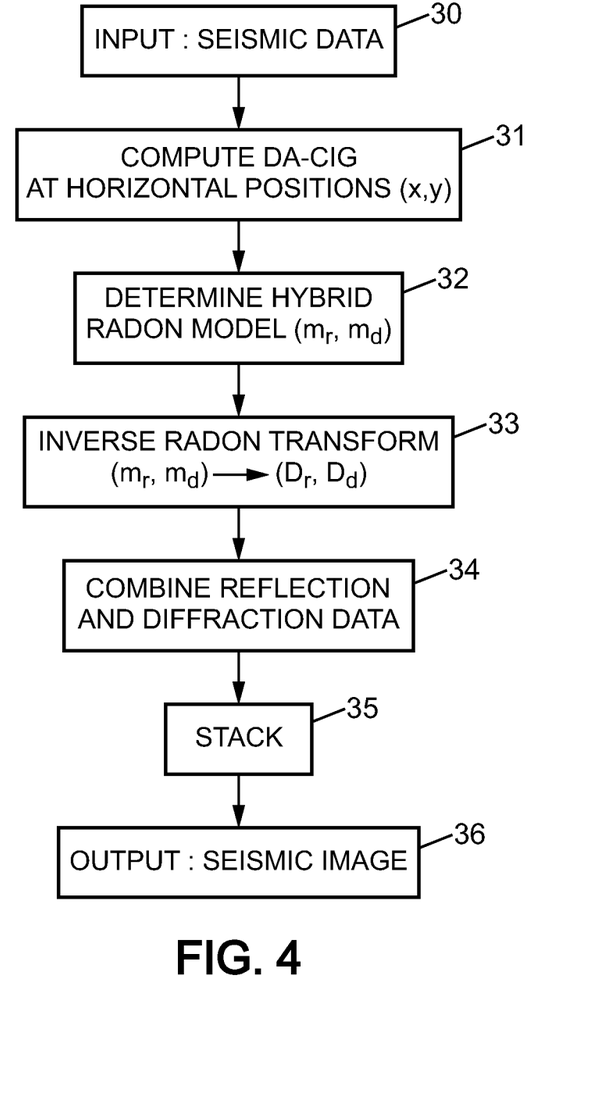
FIG. 4 is a flow chart of an exemplary method in accordance with the invention.

The LAHRT method whose flowchart is generally depicted in FIG. 4 aims at producing seismic images having a low residual noise level, while keeping features representative of small-scaled structures which typically produce diffraction components in the measured seismic signal.

In the first step 30, seismic data are received as input for the analysis method. The seismic data has been gathered on the field, using technologies well known in the art. In the second step 31, DA-CIGs are computed at different horizontal positions (x, y). The DA-CIGs are generated from the measured seismic data using conventional migration techniques.

In step 32, a hybrid Radon model is determined as an alternative parameter representation of the DA-CIG in a model space ($m_r$, $m_d$). The Radon representation is said to be hybrid because it includes both a reflection model $m_r$ and a diffraction model $m_d$.

A convenient reflection model can be defined as follows based on the DA-CIG data noted d(α, z). A first reflection Radon operator $L_r^{-1}$ is defined from the 2-dimensional DA-CIG data space to a 3-dimensional parameter space (ζ, c, z') by referring to the parabola-shaped features, where ζ is a parabola apex shift, c is a parabola curvature and z' is a parabola apex depth:

$$m_r(\zeta, c, z') = \sum_\alpha d(\alpha, z = z' + c \cdot (\alpha - \zeta)^2) \tag{1}$$

A second reflection Radon operator $L_r$ is defined from the model space back to the original data space as follows:

$$D_r(\alpha, z) = \sum_c \sum_\zeta m_r(\zeta, c, z' = z - c \cdot (\alpha - \zeta)^2) \tag{2}$$

For diffractions, the Radon model may be defined using first diffraction Radon operator $L_d^{-1}$ from the 2-dimensional DA-CIG data space (α, z) to another 3-dimensional parameter space (γ, η, $z_1$) where γ is a velocity model accuracy parameter (γ=$V_m$/V), η designates a lateral distance between a diffractor and an image point, and $z_1$ is a diffractor depth:

$$m_d(\gamma, \eta, z_1) = \sum_\alpha d(\alpha, z = z_1 + a(\gamma, \eta, \alpha)) \tag{3}$$

where:

$$a(\gamma, \eta, \alpha) = \frac{\gamma \cdot \cos(\alpha) \cdot (\gamma \cdot \eta \cdot \sin(\alpha) + \Delta)}{1 - \gamma^2 \cdot \sin^2(\alpha)}$$

with:

$$\Delta = \sqrt{z^2 \cdot (1 - \gamma^2 \cdot \sin^2(\alpha) + \eta^2}$$

A second diffraction Radon operator $L_d$ for transforming from the diffraction model space (γ, η, $z_1$) back to the original data space (α, z) is then defined as:

$$D_d(\alpha, z) = \sum_\gamma \sum_\eta m_d(\gamma, \eta, z_1 = z - a(\gamma, \eta, \alpha)) \tag{4}$$

In practice, due to the noise in the input DA-CIG data, it is not appropriate to directly apply the first Radon operators $L_r^{-1}$, $L_d^{-1}$ mentioned above. Instead, a minimization procedure is carried out to determine the hybrid model that best fits the input data in a least-square sense. This may, for example, be performed by minimizing the objective function F:

$$F(m_d, m_r) = \|L_d \cdot m_d + L_r \cdot m_r - d\|_2 + \epsilon_d \|W_d \cdot m_d\|_2 + \epsilon_r \|W_r \cdot m_r\|_2 \tag{5}$$

where $\epsilon_d$ and $\epsilon_r$ are diffraction and reflection measures of sparseness, respectively. In formula (5), the notations $m_d$ and $m_r$ are abbreviations for model vectors including values of the diffraction and reflection models at sampled positions of the model space, to which the Radon operators $L_d$ and $L_r$ are applied, and d denotes a corresponding input vector whose components are the sampled values of the DA-CIG data. $W_d$ and $W_r$ designate model space weights arranged in diagonal matrices.

Figure 5:
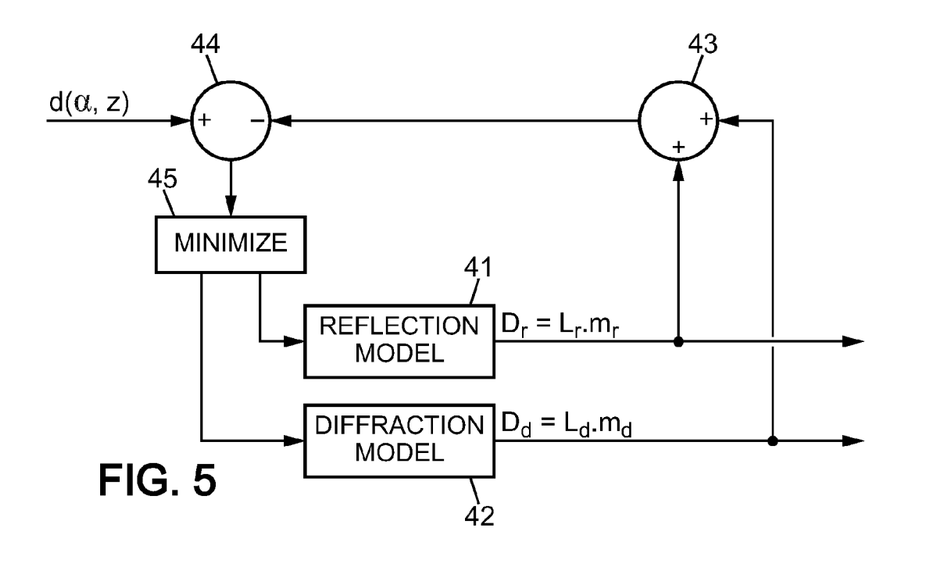
FIG. 5 is a diagram illustrating the generation of reflection and diffraction data in an embodiment.

The minimization process performed in step 32 is diagrammatically depicted in FIG. 5. The reflection model $m_r$ and the diffraction model $an_d$ are generated by units 41 and 42 which convert them into the original data space using formulas (2) and (4). The reflection and diffraction data $D_r$ and $D_d$ thus obtained are summed at 43 and the resulting combination is subtracted from the input data $d(\alpha, z)$ at 44. The minimization unit 45 applies a least-square-type of algorithm to minimize the magnitude of the difference $d(\alpha, z)-[D_r(\alpha, z)+D_r(\alpha, z)]$. It controls the reflection and diffraction model generators 41, 42 in order to find the optimal model parameters $m_r$, $m_d$. An example of known minimization algorithm which can be used is the limited-memory quasi-Newton method.

Once the optimal reflection and diffraction models $m_r$, $m_d$ have been determined in step 32, and inverse Radon transform is applied in step 33 using the operators $L_r$, $L_d$ corresponding to formulas (2) and (4), to generate reflection data $D_r$ and diffraction data $D_d$ which are considered to best represent the structure of the subsurface at the horizontal position of the current DA-CIG.

However, when inverting the reflection model, the reflection Radon operator $L_r$ is adapted to restrict the insertion trajectories in the apex vicinity only, while the diffraction component $D_d$ is fully inverted. The size of the apex vicinity can be defined on the basis of the stationary phase principle and Fresnel zone considerations. For example, this means that formula (2) may be adapted to compute the reflection data $D_r(\alpha, z)$ for a dip angle $\alpha$ and a depth z as:

$$D_r(\alpha, z) = \sum_c \sum_{\zeta=\alpha-\sqrt{\frac{\lambda}{4c}}}^{\zeta=\alpha+\sqrt{\frac{\lambda}{4c}}} m_r(\zeta, c, z' = z - c \cdot (\alpha - \zeta)^2) \qquad (2')$$

where $\lambda$ designates an average value of the wavelength of the seismic waves used in the measurement step. The wavelength is defined as $\lambda=V/f$ where V is the wave propagation velocity and f is the main frequency, both V and f being functions of z. Since each parabola is defined by an equation $z=z'+c\cdot(\alpha-\zeta)^2$, the optimal aperture in terms of Fresnel zone can be approximated as $c\cdot(\alpha-\zeta)^2=\lambda/4$, in other words $$\alpha = \zeta \pm \sqrt{\frac{\lambda}{4c}}.$$

The above-described LAHRT procedure eliminates a major part of the noise which is due to the tail portions of the parabola-shaped features while keeping the information contained in the diffraction components of the DA-CIG.

The resulting reflection data $D_r$ and diffraction data $D_d$ can then be added together to obtain a processed DA-CIG, $D=D_r+D_d$, in step 34. These DA-CIGs for different horizontal positions (x, y) are then summed in the stacking step 35 to provide the PSDM seismic image output in step 36.

To illustrate performance of the LAHRT method in an embodiment, examples are presented in FIGS. 6-15.

Figure 6:
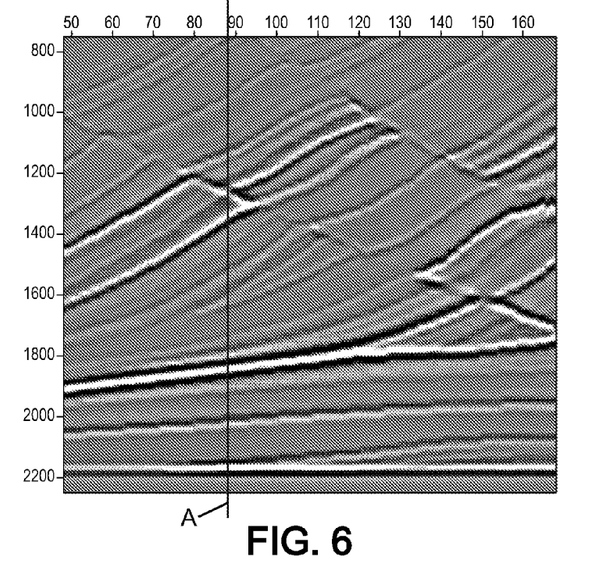
FIGS. 6-7 show an example of depth migrated section of the subsurface (FIG. 6) obtained from synthetic data using a correct velocity model and a DA-CIG (FIG. 7) at the horizontal position indicated by the vertical line in FIG. 6.
Figure 7:
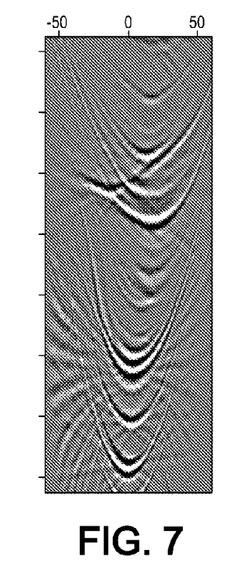

FIG. 6 shows a depth-migrated section obtained from synthetic data using the correct velocity model, and a DA-CIG at the horizontal position A is shown in FIG. 7. The synthetic input data are well sampled (inter-trace distance is 25 m), and the migration does not suffer from aliasing effects. Reflector truncations produce multiple apices at the same depth in some DA-CIGs. In the processed DA-CIG of FIG. 7, two apices are located at the depth of about 1.25 km.

Figure 8:
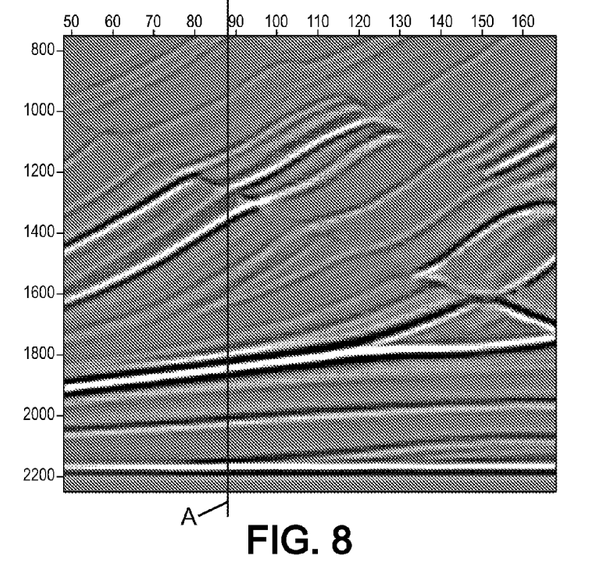
FIGS. 8-9 show an example of depth migrated section of the subsurface (FIG. 8) obtained from the same synthetic data as in FIGS. 6-7 using an apex-saving approach and a DA-CIG (FIG. 9) at the same horizontal position indicated by the vertical line in FIG. 8.
Figure 9:
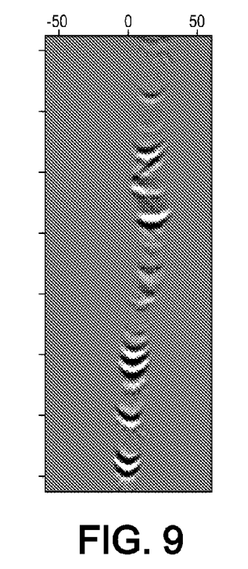
Figure 10:
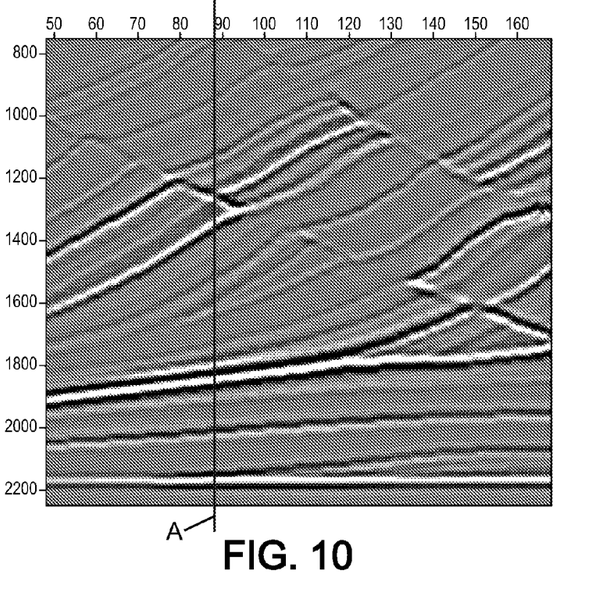
FIGS. 10-11 show an example of depth migrated section of the subsurface (FIG. 10) obtained from the same synthetic data as in FIGS. 6-9 using the LAHRT approach according to an embodiment of the invention and a DA-CIG (FIG. 11) at the same horizontal position indicated by the vertical line in FIG. 10.
Figure 11:
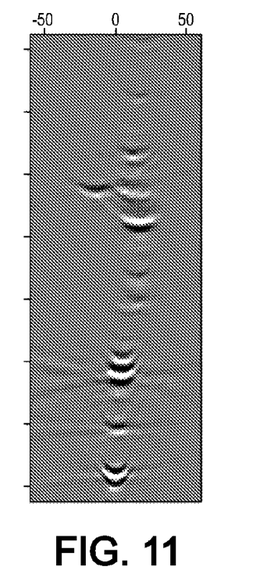

FIGS. 8-9 show the apex saving approach presented in the above-mentioned Bienati, et al., 2009 paper, with a migration aperture limited by reflection smiles apex vicinities. The migrated image (FIG. 8) is over-smoothed and small scale structural features such as fault planes and steps are not preserved. The processed DA-CIG (FIG. 9) does not contain diffraction component. It also loses multiple apices located at the same depth.

Next, FIGS. 10-11 show again the same migrated section and DA-CIG obtained with the LAHRT procedure described above. The migrated image (FIG. 10) looks almost identical to the reference image shown in FIG. 6. The processed DA-CIG (FIG. 11) contains mainly specular reflection energy concentrated in a vicinity of the apices and diffractions represented by the quasi-linear events. "Tails" of the reflection response are not contributing to the image.

Figure 12:
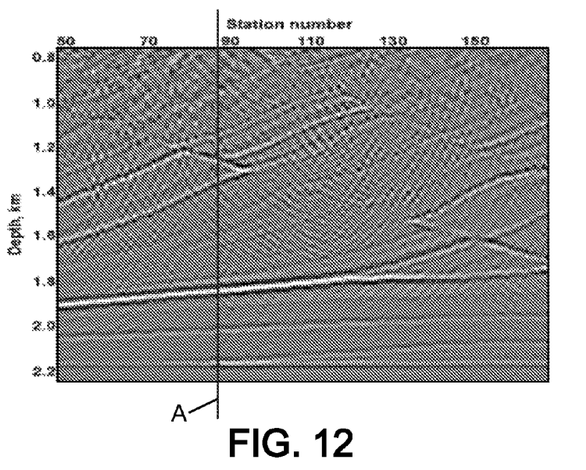
FIGS. 12-13 show an example of depth migrated section of the subsurface (FIG. 12) obtained from the decimated synthetic data using the apex-saving approach and a DA-CIG (FIG. 13) at the horizontal position indicated by the vertical line in FIG. 12.
Figure 13:
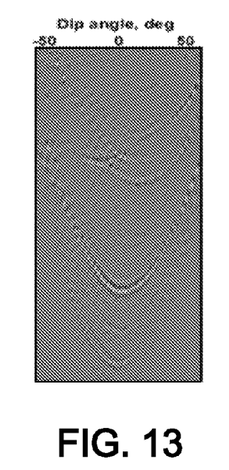

FIG. 12 shows a migrated section obtained with decimated input data. The decimated data was obtained from the synthetic seismic data used in FIGS. 6-11 by removing every second trace. The inter-trace distance is thus 50 m instead of 25 m, resulting in data aliasing. The migrated image of FIG. 12 is contaminated with strong migration noise and the corresponding processed DA-CIG shown in FIG. 13 clearly suffers from aliasing.

Figure 14:
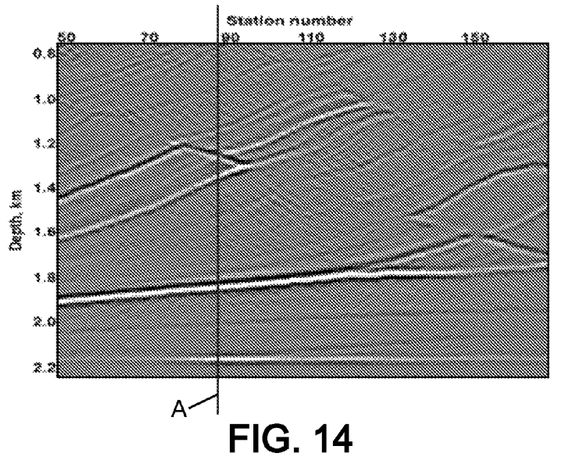
FIGS. 14-15 show an example of depth migrated section of the subsurface (FIG. 14) obtained from the same decimated synthetic data as in FIGS. 12-13 using the LAHRT approach according to an embodiment of the invention and a DA-CIG (FIG. 15) at the same horizontal position indicated by the vertical line in FIG. 14.
Figure 15:
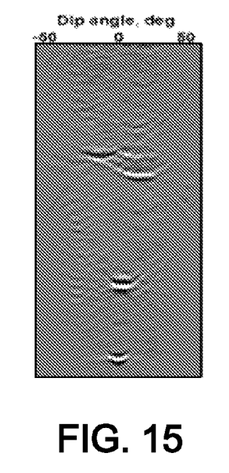

The migrated common image gathers were also determined from the decimated data using the LAHRT procedure. The result is shown in FIGS. 14-15. Most of the migration noise caused by the input data aliasing disappeared. The DA-CIG of FIG. 15 contains mostly reflection energy concentrated in the vicinity of the apices. So to speak, "holes" caused by the aliasing are filled.

Figure 16:
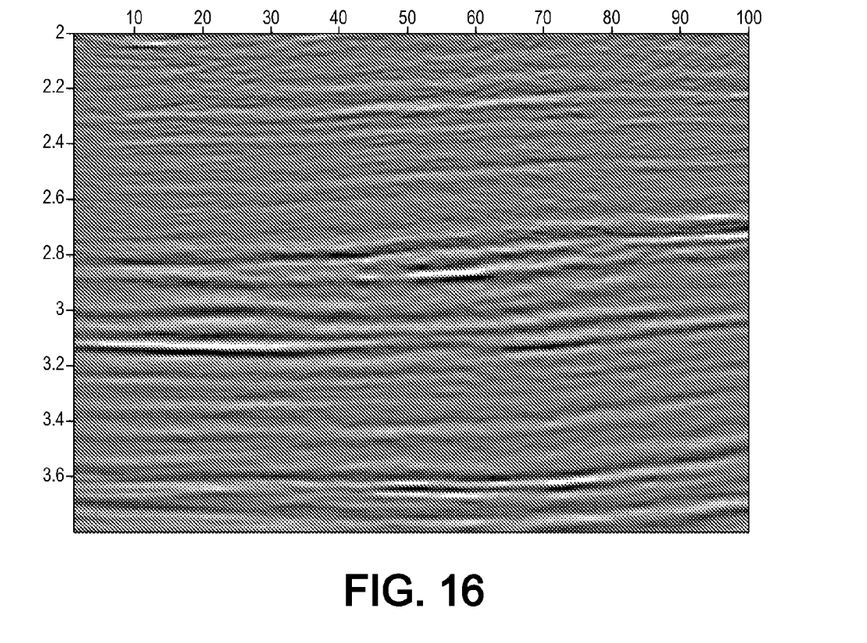
FIG. 16 is an example of depth migrated section of the subsurface obtained conventionally from real seismic data.
Figure 17:
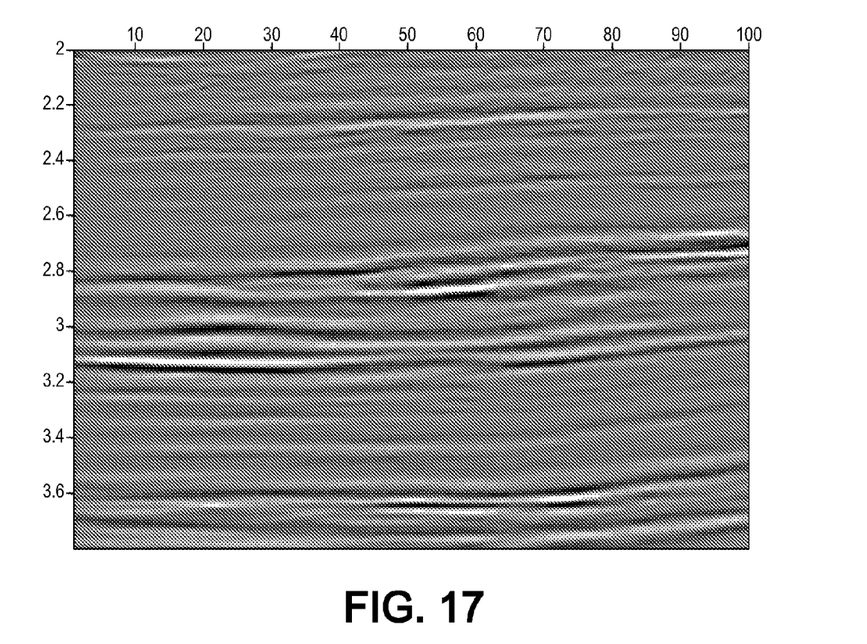
FIG. 17 is an example of depth migrated section of the subsurface obtained from the real seismic data as in FIG. 16 using the LAHRT approach according to an embodiment of the invention.

Migration of real seismic data is illustrated in the other example of FIGS. 16-17. The conventional migrated image (FIG. 16) contains many artifacts in the form of inclined linear noise and migration smiles. After migration using the LAHRT procedure the noise is strongly reduced (FIG. 17). The scattering points in the upper part of the image which can be associated with small scale heterogeneities or fractures are preserved.

The embodiments of the method described herein may be implemented on any form of computer or computers and the components may be implemented as dedicated applications or in client-server architectures, including a web-based architecture, and can include functional programs, codes, and code segments. Any of the computers may comprise a processor, a memory for storing program data and executing it, a permanent storage such as a disk drive, a communications port for handling communications with external devices, and user interface devices, including a display, keyboard, mouse, etc.

Typically, the method is carried out using software modules which may be stored as program instructions or computer readable codes executable on the processor on a computer-readable media such as read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. This media is readable by the computer, stored in the memory, and executed by the processor.

It will be appreciated that the embodiments described above are illustrative of the invention disclosed herein and that various modifications can be made without departing from the scope as defined in the appended claims.

The invention claimed is:

1. A method for analyzing seismic data, comprising:
   generating a post-migration common image gather in a dip angle domain from measured seismic data;
   determining a hybrid Radon model associated with the common image gather, including a reflection model related to concave features in the common image gather and a diffraction model related to linear features in the common image gather;
   transforming the reflection model with a reflection Radon operator applied along inversion trajectories restricted around apices of the concave features to obtain reflection data; and
   transforming the diffraction model with a diffraction Radon operator to obtain diffraction data, so as to eliminate a major part of the noise from the data while keeping the information contained in the diffraction components of a dip angle common image gather.

2. The method as claimed in claim 1, further comprising adding the reflection data and diffraction data obtained by transforming the reflection and diffraction models with the Radon operators, to obtain a processed common image gather.

3. The method as claimed in claim 1, wherein determining the hybrid Radon model associated with the common image gather comprises minimizing an objective function:

$$F(m_d, m_r) = \|L_d \cdot m_d + L_r \cdot m_r - d\|_2 + \epsilon_d \|W_d \cdot m_d\|_2 + \epsilon_r \|W_r \cdot m_r\|_2$$

where $m_d$ and $m_r$ are data vectors of the diffraction model and of the reflection model, respectively, $L_d$ and $L_r$ are the diffraction and reflection Radon operators, respectively, d represents a data vector of the common image gather, $W_d$ and $W_r$ are model space weights, $\epsilon_d$ and $\epsilon_r$ are measures of sparseness for diffraction and reflection, respectively, and $\|\cdot\|_2$ is an $L_2$ measure.

4. The method as claimed in claim 1, wherein transforming the reflection model $m_r(\zeta, c, z')$ with the reflection Radon operator comprises computing the reflection data $D_r(\alpha, z)$ as:

$$D_r(\alpha, z) = \sum_c \sum_\zeta m_r(\zeta, c, z' = z - c \cdot (\alpha - \zeta)^2)$$

where $\alpha$ and z are respectively dip angle and depth coordinates in the common image gather, c, $\zeta$ and z' are respectively parabola curvature, parabola apex shift and depth coordinates in the reflection model, the sum on the parabola apex shift coordinate $\zeta$ being restricted to values of $\zeta$ around the dip angle coordinate $\alpha$.

5. The method as claimed in claim 2, further comprising obtaining processed common image gathers for different horizontal positions and summing, the data in the processed common image gathers to generate a migrated image of the subsurface.

6. The method as claimed in claim 4, wherein, when computing the reflection data $D_r(\alpha, z)$ for a dip angle coordinate $\alpha$ and a depth coordinate z, the sum on the parabola apex shift coordinate $\zeta$ is restricted, for a given, value of the parabola curvature coordinate c, to values of $\zeta$ different from $\alpha$ by less than about $$\pm \sqrt{\frac{\lambda}{4c}},$$

where $\lambda$ is an average wavelength of seismic waves used to measure the seismic data.

7. A system for analyzing seismic data, comprising a computer resource configured to perform steps of:
   generating a post-migration common image gather in a dip angle domain from measured seismic data;
   determining a hybrid Radon model associated with the common image gather, including a reflection model related to concave features in the common image gather and a diffraction model related to linear features in the common image gather;
   transforming the reflection model with a reflection Radon operator applied along inversion trajectories restricted around apices of the concave features to obtain reflection data; and
   transforming the diffraction model with a diffraction Radon operator to obtain diffraction data; said system eliminates a major part of the noise from the data while keeping the information contained in a diffraction component of the dip angle common image gather.

8. The system as claimed in claim 7, wherein the computer resource is further configured to add the reflection data and diffraction data obtained by transforming the reflection and diffraction models with the Radon operators, to obtain a processed common image gather.

9. The system as claimed in claim 7, wherein determining the hybrid Radon model associated with the common image gather comprises minimizing an objective function:

$$F(m_d, m_r) = \|L_d \cdot m_d + L_r \cdot m_r - d\|_2 + \epsilon_d \|W_d \cdot m_d\|_2 + \epsilon_r \|W_r \cdot m_r\|_2$$

where $m_d$ and $m_r$ are data vectors of the diffraction model and of the reflection model, respectively, $L_d$ and $L_r$ are the diffraction and reflection Radon operators, respectively, d represents a data vector of the common image gather, $W_d$ and $W_r$ are model space weights, $\epsilon_d$ and $\epsilon_r$ are measures of sparseness for diffraction and reflection, respectively, and $\|\cdot\|_2$ is an $L_2$ measure.

10. The system as claimed in claim 7, wherein transforming the reflection model $m_r(\zeta, c, z')$ with the reflection Radon operator comprises computing the reflection data $D_r(\alpha, z)$ as:

$$D_r(\alpha, z) = \sum_c \sum_\zeta m_r(\zeta, c, z' = z - c \cdot (\alpha - \zeta)^2)$$

where $\alpha$ and z are respectively dip angle and depth coordinates in the common image gather, c, $\zeta$ and z' are respectively parabola curvature, parabola apex shift and depth coordinates in the reflection model, the sum on the parabola apex shift coordinate $\zeta$ being restricted to values of $\zeta$ around the dip angle coordinate $\alpha$.

11. The system as claimed in claim 8, wherein the computer resource is further configured to obtain processed common image gathers for different horizontal positions and to sum the data in the processed common image gathers to generate a migrated image of the subsurface.

12. The system as claimed in claim 10, wherein, when computing the reflection data $D_r(\alpha, z)$ for a dip angle coordinate $\alpha$ and a depth coordinate z, the sum on the parabola apex shift coordinate $\zeta$ is restricted, for a given value of the parabola curvature coordinate c, to values of $\zeta$ different from $\alpha$ by less than about $$\pm\sqrt{\frac{\lambda}{4c}},$$

where $\lambda$ is an average wavelength of seismic waves used to measure the seismic data.

13. A non-volatile computer readable medium having stored thereon a computer program product for a system for analyzing seismic data, wherein the program product comprises instructions to have said system performing steps of:
generating a post-migration common image gather in a dip angle domain from measured seismic data;
determining a hybrid Radon model associated with the common image gather, including a reflection model related to concave features in the common image gather and a diffraction model related to linear features in the common image gather;
transforming the reflection model with a reflection Radon operator applied along inversion trajectories restricted around apices of the concave features to obtain reflection data; and
transforming the diffraction model with a diffraction Radon operator to obtain diffraction data, wherein instructions of the program product eliminates a major part of the noise from the data while keeping the information contained in the diffraction components of a dip angle common image gather.

14. The non-volatile computer readable medium as claimed in claim 13, wherein the program product further comprises instructions to have said system adding the reflection data and diffraction data obtained by transforming the reflection and diffraction models with the Radon operators, to obtain a processed common image gather.

15. The non-volatile computer readable medium as claimed in claim 13, wherein determining the hybrid Radon model associated with the common image gather comprises minimizing an objective function:

$$F(m_d, m_r) = \|L_d \cdot m_d + L_r \cdot m_r - d\|_2 + \epsilon_d \|W_d \cdot m_d\|_2 + \epsilon_r \|W_r \cdot m_r\|_2$$

where $m_d$ and $m_r$ are data vectors of the diffraction model and of the reflection model, respectively, $L_d$ and $L_r$ are the diffraction and reflection Radon operators, respectively, d represents a data vector of the common image gather, $W_d$ and $W_r$ are model space weights, $\epsilon_d$ and $\epsilon_r$ are measures of sparseness for diffraction and reflection, respectively, and $\|\cdot\|_2$ is an $L_2$ measure.

16. The non-volatile computer readable medium as claimed in claim 13, wherein transforming the reflection model $m_r(\zeta, c, z')$ with the reflection Radon operator comprises computing the reflection data $D_r(\alpha, z)$ as:

$$D_r(\alpha, z) = \sum_c \sum_\zeta m_r(\zeta, c, z' = z - c \cdot (\alpha - \zeta)^2)$$

where $\alpha$ and z are respectively dip angle and depth coordinates in the common image gather, c, $\zeta$ and z' are respectively parabola curvature, parabola apex shift and depth coordinates in the reflection model, the sum on the parabola apex shift coordinate $\zeta$ being restricted to values of $\zeta$ around the dip angle coordinate $\alpha$.

17. The non-volatile computer readable medium as claimed in claim 14, wherein the program product further comprises instructions to have said system obtaining processed common image gathers for different horizontal positions and summing the data in the processed common image gathers to generate a migrated image of the subsurface.

18. The non-volatile computer readable medium as claimed in claim 16, wherein, when computing the reflection data $D_r(\alpha, z)$ for a dip angle coordinate $\alpha$ and a depth coordinate z, the sum on the parabola apex shift coordinate $\zeta$ is restricted, for a given value of the parabola curvature coordinate c, to values of $\zeta$ different from $\alpha$ by less than about $$\pm\sqrt{\frac{\lambda}{4c}},$$

where $\lambda$ is an average wavelength of seismic waves used to measure the seismic data.

* * * * *